United States Patent [19]

Laugal et al.

[11] Patent Number: 5,194,560
[45] Date of Patent: Mar. 16, 1993

[54] FLEXIBLE ARYL ALKYL EPOXY RESINS, THEIR AMINE RESIN DERIVATIVES AND THEIR USE IN ELECTRODEPOSITION COATINGS

[75] Inventors: James A. Laugal, Union Lake; Glenn E. Martin, Farmington Hills; Donald L. St. Aubin, Westland; Gerald G. Wold, Brighton, all of Mich.

[73] Assignee: BASF Corporation

[21] Appl. No.: 672,975

[22] Filed: Mar. 21, 1991

Related U.S. Application Data

[62] Division of Ser. No. 327,751, Mar. 23, 1989, Pat. No. 5,021,470, which is a division of Ser. No. 77,492, Jul. 24, 1987, Pat. No. 4,857,567.

[51] Int. Cl.$^5$ ............................................. C08G 59/00
[52] U.S. Cl. ..................................... 528/97; 528/104
[58] Field of Search ................... 528/103, 110, 97, 104

[56] References Cited

U.S. PATENT DOCUMENTS 4,608,313  8/1986  Hickner et al. ..................... 523/400

Primary Examiner—Melvyn I. Marquis
Assistant Examiner—D. E. Aylward
Attorney, Agent, or Firm—Kenyon & Kenyon

[57] ABSTRACT

A series of oligomeric adducts of diols and diepoxides are disclosed which are precursors of amine resins for use in electrodeposition coatings. The adducts are epoxide-alcohol addition products of a polyaromatic and/or a mono-aromatic diol and a polyaromatic bis-glycidyl ether, and/or a monoaromatic bis-glycidyl ether and/or an alkoxy arylene bis-glycidyl ether, thioether or amine. The coatings which include amine resin, cross linking agent, grind resin and pigment exhibit excellent corrosion resistance.

17 Claims, No Drawings

FLEXIBLE ARYL ALKYL EPOXY RESINS, THEIR AMINE RESIN DERIVATIVES AND THEIR USE IN ELECTRODEPOSITION COATINGS

CROSS REFERENCE TO RELATED APPLICATIONS

This application is a divisional application of U.S. patent application Ser. No. 327,751, filled on Mar. 23, 1989, now U.S. Pat. No. 5,021,470, which was a divisional application of U.S. patent application Ser. No. 077,492, filed Jul. 24, 1987, now U.S. Pat. No. 4,857,567.

BACKGROUND OF THE INVENTION

The present invention relates to epoxide compound resins which are oligomeric adducts of diols and diepoxides, to the amine resins thereof, and to compositions containing the amine resins which can be used in electrodeposition baths to produce the corresponding hardened resin coatings.

Cathodic electrodeposition of a film composed of amine resin, crosslinker, pigment and other resinous components onto an electrically conductive article is an important industrial process. It constitutes the usual manner in which automobile and truck bodies as well as appliance and other large metallic surface bodies are undercoated with paint. In addition to providing a painted surface, the resin systems employed protect the underlying metal surface from corrosion, impact damage and other detrimental exposure to environmental conditions.

In performing the electrodeposition, the conductive article forms one electrode and is immersed in a coating bath made from an aqueous dispersion of the film forming resin and other components. An electrical current is passed between the article and the counterelectrode in the electrodeposition bath. A charge on the article causes deposition of the resins and other components in the bath so as to produce the electrodeposit film. The deposited film is then baked or otherwise hardened to yield a coating of a substantially uniform thickness and protective characteristics.

Generally, protection from environmental and other adverse conditions is accomplished by designing into the coating resins such chemical characteristics as adhesiveness, flexibility, strength, hardness and inertness toward reaction with environmental elements. Each of these characteristics manifests itself in the protective properties of the hardened coating.

A number of advances in the protective properties of electrodeposit resin systems have been described in the patent literature. For example, U.S. Pat. Nos. 4,104,147; 4,148,772; 4,420,574; 4,423,166; 3,962,165; 4,071,428; 4,101,468; 4,134,816; 3,799,854; 3,824,111; 3,922,253; 3,925,180; 3,947,338; 3,947,339, the disclosures of which are incorporated herein by reference, describe methods for improvement of the principal resin properties. The amine resin used in the coating disclosed in these patents can be flexibilized by extending the molecular length of the aromatic diepoxide starting material with polyols, with polyamines, polyether polyols, polyester polyols and other similar types of extension agents. The amine group functionality of these amine resins can also be altered according to these patents to develop protective properties. Additionally, the chemical structure of the resin cross-linking agent affects the protective properties according to these patents.

Generally, the electrodeposition bath will also contain pigment and pigment grind resins. These components are deposited as part of the coating and design characteristics are also important for them. Such patents as U.S. Pat. Nos. 3,936,405 and 4,035,275, the disclosures of which are incorporated herein by reference, as well as others describe beneficial characteristics for such grind resins.

It is also desirable to obtain as thick an electrodeposition coating as possible. Several studies have been reported in which the hardened coating thickness has been increased over that of the typical 16 micron to 20 micron film thickness produced by so-called "standard build" amine resin/polyisocyanate compositions. U.S. Pat. No. 4,487,674 (the disclosure of which is incorporated herein by reference), for example, discloses compositions for producing thick films which constitute combinations of surfactants and the amine resins disclosed in the foregoing U.S. patents.

It has been found, however, that the electrodeposition coatings described in the prior art do not achieve high corrosion resistivity and the adhesiveness for superior protection of today s vehicular bodies. It is believed these problems are the result of a two-fold difficulty. While strength and rigidity characteristics are desirable design features of principal resin system coatings, the incorporation of appropriate chemical groups providing these characteristics often adversely effects the flexibility and adhesiveness of the coatings. Consequently a balance is typically obtained between strength/rigidity and flexibility/adhesiveness. As a result, the coatings described in the prior art do not exhibit both high corrosion resistance and high strength characteristics.

Therefore, it is an object of the invention to design an amine resin system for use in an electrodeposition coating which is of high strength while also being highly resistant toward corrosion of the underlying metallic surface It is further an object of the invention to design a principal amine resin that is flexible enough to provide a low melt viscosity and a low glass transition temperature so that uniform coatings are produced. Yet another object of the invention is the improvement of the coating adhesiveness toward the underlying substrate surface. Further objects of the invention will become apparent from the description of the invention presented herein below.

SUMMARY OF THE INVENTION

These and other objects are achieved by the invention which is directed to flexibilized epoxide compounds, their corresponding amine resins, as well as principal resin emulsions and electrodeposition compositions, both being formed from the amine resins. The invention as well is directed to a process for coating a metallic substrate which employs the electrodeposition compositions as electrodeposition baths and articles of manufacture produced according to this process.

The epoxide compounds of the invention are addition reaction oligomers of a diol monomer and a diepoxide monomer wherein the diol monomer is chosen from a group including Diol D1, Diol D2, and a mixture thereof, and the diepoxide monomer is chosen from a group including Diepoxide E1, Diepoxide E2, Diepoxide E3 and a mixture of any two or all three of these Diepoxides. The addition reaction oligomers have epoxide groups at both termini. While the oligomer of Diol D1 and Diepoxide E1 is excluded, the remaining twenty combinations of diol and diepoxide monomers provide the twenty classes of addition reaction oligomers of the invention.

The diol monomers, Diol D1 and Diol D2, respectively have at least one aryl group between the two hydroxyls present.

The diepoxide monomers, Diepoxide E1, Diepoxide E2 and Diepoxide E3, are bis-glycidyl ethers respectively of Diol D1, a bis-(labile hydrogen functionalized) alkoxy arylene, and Diol D2.

The bis (labile hydrogen functionalized alkoxy) arylene used to form Diepoxide E2 is the monoaddition product of either Diol D1 or Diol D2 and an alkyl or alkoxy alkyl heterocyclopropane wherein the heteroatom of the heterocyclopropane is an oxygen, sulphur or nitrogen, i.e. the heterocyclopropane is an epoxide, episulfide or aziridine. Accordingly, the liabile hydrogen functional group of the bis (labile hydrogen functionalized alkoxy) arylene is a hydroxyl, a thiol or a primary or secondary amine resulting from the ring opening of the heterocyclopropane.

The addition reaction oligomers formed from the foregoing combinations of diol and diepoxide monomers contain alternating monomeric units of diol and diepoxide, the hydroxy groups of the diol monomeric units having reacted with the epoxide groups of the diepoxide monomeric units so as to open the epoxide ring and form a secondary alcohol group within the diepoxide monomeric unit and an ether linkage between the diol and diepoxide monomeric units. In addition to the alternating sequence of diol and diepoxide monomeric units, the distribution of the mixture of diols, if used, and the distribution of the mixture of diepoxides, if used, may be random or ordered. If a random distribution is present, the order of differing diol and diepoxide monomeric units along the oligomer chain will be random. If an ordered distribution is present, the oligomer chain will comprise blocks of one of the Diols reacted with one of the Diepoxides. These blocks will be coupled together to provide alternating groups of the several blocks present.

The amine resins according to the invention are the reaction products of the foregoing twenty classes of epoxide compounds and an amine such as ammonia, a mono- or poly-organic amine wherein the amine groups may be primary, secondary, or tertiary or combinations thereof, a heterocyclic amine or mixture of the heterocyclic amine and the mono- or poly-organic amine. Also included are physical blends and chemical mixtures of these amines.

The combinations of diol and diepoxide monomeric units within the molecular formulas of the amine resins of the invention contribute to high adhesiveness, high corrosion resistance, high impact strength of the coated hardened films of the invention. In addition, the amine resins display high flow characteristics and flexibility owing to the presence of these combinations.

The principal resin emulsions according to the invention are formed by combination of the amine resins, cross-linking agents, water and a neutralizing portion of a low molecular weight organic acid. Preferred embodiments of the cross-linking agents include a blocked organic polyisocyanate and a poly (beta-hydroxy ester) as well as a poly (beta-alkoxy ester) compound.

The aqueous electrodeposition compositions according to the invention are composed of a combination of the principal resin emulsions and a pigment-grind resin formulation. The preferred grind resin employed in the pigment-grind resin formulation is a quaternary ammonium salt or an esterified, alkoxylated aliphatic amine. Preferred embodiments of the aqueous electrodeposition compositions include those wherein the solids content is about 10% to about 60% by weight, the solids content being adjusted by the addition of water; those wherein the ratio of weight percentage of the pigment-grind resin formulation and the principal resin emulsion is from about 1:10 to about 2:5; and those wherein the pH of the composition is from about 2.0 to about 8.5. In addition, it is preferred that the ratio by weight of the pigment to grind resin in the pigment-grind resin formulation is from about 2:1 to about 6:1.

The electrodeposition compositions are used according to the invention to prepare electrodeposition baths for electrocoating of a metallic substrate, such as an automobile or a truck vehicle body. The electrodeposition compositions are diluted with appropriate aqueous mixtures of water, organic acid, flow agents, anti-pitting agents, coalescing solvents, film build additives, and other suitable additives to achieve appropriate and desired coating appearance and qualities.

According to the invention, the process of electrocoating a metallic substrate in a cathodic electrodeposition bath is accomplished by forming the coating bath, connecting the metallic substrate as a cathode to a DC electric circuit, immersing the substrate in the bath, passing an electric current through the substrate thereby depositing a film of amine resin, cross-linking agent, pigment, grind resin and other bath additives on the substrate, removing the substrate coated with the film from the bath and baking the deposited film to produce a hardened, cross-linked resin coating on the substrate.

The invention further includes articles of manufacture produced according to the foregoing process of electrodeposition.

DETAILED DESCRIPTION OF THE INVENTION

The novel chemical character of the epoxide compounds according to the invention manifests itself in desirable properties of the corresponding amine resin components used in the electrodeposition baths according to the invention. The preferred and especially preferred embodiments of the epoxide compounds of the invention include thirteen and seven classes respectively of resinous oligomer based on the monomeric content present between the epoxy termini of the oligomers. The monomers used to build the oligomeric structure of the epoxide compounds include rigid and flexible diepoxides and lower and higher molecular weight aromatic diols which couple the diepoxides together.

- In the especially preferred embodiments of the invention, the groups of Diols and Diepoxides, which form the addition reaction oligomers, may be reacted in any of several combinations including:

I. A combination of Diol D1 and Diepoxides E1 and E2 (hereinafter designated as the D2E epoxide compound");

II. A combination of Diols D1 and D2 and Diepoxides E1 and E2 (hereinafter designated as the 2D2E epoxide compound);

III. A combination of Diols D1 and D2 and the three Diepoxides E1, E2 and E3 (hereinafter designated as the 2D3E epoxide compound);

IV. A combination of the two Diols D1 and D2 and Diepoxide E1 (hereinafter designated as the 2DE epoxide compound);

V. A combination of Diol D1 and the three Diepoxides E1, E2 and E3 (hereinafter designated as the D3E epoxide compound);

VI. A combination of Diol D1 and Diepoxides E2 and E3 (hereinafter designated as the DEE epoxide compound); and VII. A combination of Diols D1 and D2 and diepoxides E2 and E3 (hereinafter designated as the 2DEE epoxide compound).

Other preferred embodiments of the invention include addition reaction oligomers of the following combinations of diol and diepoxide monomers:

VIII. A combination of Diol D1 and Diepoxide E2;
IX. A combination of Diol D1 and Diepoxide E3;
X. A combination of Diol D1 and Diepoxides E1 and E3;
XI. A combination of Diol D2 and Diepoxide E1;
XII. A combination of Diol D2 and Diepoxide E2;
XIII. A combination of Diol D2 and Diepoxide E3;
XIV. A combination of Diol D2 and Diepoxides E1 and E2;
XV. A combination of Diol D2 and Diepoxides E1 and E3;
XVI. A combination of Diol D2 and Diepoxides E2 and E3;
XVII. A combination of Diol D2 and Diepoxides E1, E2 and E3;
XVIII. A combination of Diols D1 and D2 and Diepoxide E2;
XIX. A combination of Diols D1 and D2 and Diepoxide E3;
XX. A combination of Diols D1 and D2 and Diepoxides E1 and E3.

The Diols used as monomeric units of the epoxide compounds and amine resins of the invention are calculated to provide interatomic distances between the hydroxyls such that the portions of hydroxyl groups per molecular weight in the resulting amine resin are increased over the standard amine resins known in the art. It is believed this characteristic contributes to the adhesiveness of the films of the invention toward the metallic substrate.

Generally, the structure of Diol D1 may constitute any bis-(aryl alcohol) compound known in the art. Its preferred embodiments have the formula HO-Ar$^1$-OH, Ar$^1$ being a naphthalene group or a polyphenylene group having two or three phenylenes linked by carbon-carbon bonds or alkylene groups of 1 to 5 carbons, or a substituted derivative of the naphthalene or polyphenylene group, the substituent being halogen, alkoxy of one to six carbons (lower alkoxy), or alkyl of one to six carbons (lower alkyl).

Diol D2 generally is any monoaryl diol known in the art. Its preferred embodiments have the formula HO-Ar$^3$-OH, wherein Ar$^3$ is a phenylene or substituted phenylene group having as a substituent halogen, alkoxy of one to three carbons, or alkyl of one to three carbon atoms.

Examples of Diol D1 include p,p'-dihydroxydiphenylalkane of 1 to 3 carbons, p,p'-dihydroxydiphenyl, 1,5-dihydroxynaphthalene, bis-(hydroxynapthalene)methane, p,p'-dihydroxybenzophenone, the substituted forms of the foregoing examples wherein the substituent is halogen, or alkyl or alkoxy of one to three carbons as well as other polyphenols and poly(hydroxyaryl) compounds of a similar nature. Additional examples of polyphenol compounds which can be used as Diol D1 may be found in U.S. Pat. Nos. 4,605,609 and 4,104,147, the disclosures of which are incorporated herein by reference.

Examples of Diol D2 include resorcinol, hydroquinone or catechol as well as the substituted forms thereof wherein the substituent is halogen or lower alkyl, lower alkoxy, as well as additional mono aromatic diols known to those skilled in the art.

The general structures of the diepoxides used as diepoxide monomeric units of the epoxide compounds and amine resins of the invention are the bis-glycidyl ethers of Diol D1 or D2 or the bis-labile hydrogen functionalized alkoxy arylene compounds. The aliphatic character of the Diepoxide E2 monomer is believed to provide, in part, a flexible character to the epoxide compounds and amine resins. The aliphatic nature of this diepoxide monomer also is believed to contribute, in part, to a lowered glass transition temperature and a lower melt viscosity of the amine resins. The Diepoxide E1 and E3 monomers, in contrast, are believed to contribute, in part, to the rigidity and strength of the amine resins.

Preferred embodiments of Diepoxide E1 have the formula:

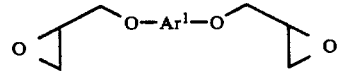

wherein Ar$^1$ is as defined above for Diol D1.

Preferred embodiment of Diepoxide E2 have the formula:

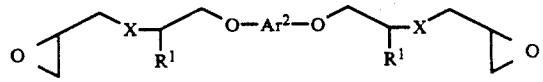

In the formula for Diepoxide E2, R$^1$ is an alkyl of one to eight carbon atoms or an alkoxy alkyl of two to eight carbon atoms X is —O—, —S— or =N—R$^2$, R$^2$ being hydrogen or alkyl or 1 to 3 carbons. Ar$^2$ is a naphthalene group, a phenylene group or a polyphenylene group having two or three phenylenes linked by carbon-carbon bonds, or alkylene groups of one to five carbons or a substituted derivative of naphthalene, phenylene or polyphenylene group, the substituent being halogen, alkoxy of one to three carbons or alkyl of one to three carbons.

In its preferred embodiment, the bis-(labile hydrogen functionalized alkoxy)arylene, which is a precursor for the preparation of Diepoxide E2 has the following formula wherein R$^1$, X and Ar$^2$ are as defined above for Diepoxide E2.

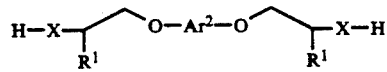

Preferred embodiments of Diepoxide E3 have the formula:

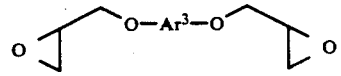

wherein Ar3 is as defined above for Diol D2.

The syntheses of the diepoxide compounds follow procedures known in the art. In such fashion, epihalohydrins such as epichlorohydrin, epibromohydrin or epiiodohydrin are reacted with the diol precursors to form the bis-glycidyl ether. Reaction conditions include use of an aprotic, polar solvent and an acid scavanger such as aqueous sodium hydroxide or other similar hydroxide base under about stoichiometric proportions and a temperature of from about 0° C. to about 100° C., preferably about ambient temperature.

The synthesis of the bis-(labile hydrogen) precursor for Diepoxide E2 is prepared by addition of either of Diols D1 or D2 to an alkyl or alkoxyalkyl monoepoxide, monoepisulfide or monoaziridine (i.e. heterocyclopropane wherein the heteroatom is —O—, —S— or =N—). Reaction conditions include an inert, organic solvent and catalyst such as a quaternary ammonium salt or a Lewis acid under about stoichiometric proportions and a temperature of from about 0° C. to about 100° C., preferably ambient temperature. These conditions will facilitate ring opening and an addition of the alcohol groups of the diol to the epoxide, episulfide or axiridine ring.

The alkyl or alkoxyalkyl monoepoxide, monoepisulfide and monoaziridine can be prepared by reaction of the corresponding aliphatic olefin or alkoxy aliphatic olefin and an oxygen, sulfur or nitrogen producing agent. Such agents include per acids such as peracidic or perbenzoic acid, sulfur dichloride, and nitrenes generated from the corresponding azides. These reactions are generally known in the art. See, for example, U.S. Pat. No. 4,284,574, the disclosure of which is incorporated by reference.

The two Diols D1 and D2 and the three Diepoxides E1, E2 and E3 are combined according to the invention in any of several combinations to produce the epoxide compounds of the invention. The sequence of diol and diepoxide monomers in the addition reaction oligomer chain alternates, and the distribution of diepoxide monomers and diol monomers, when more than one of each is present, may be random or ordered as mentioned above. In producing a random distribution, the diol and diepoxide monomers are combined as a gross mixture at the beginning of the reaction. In producing an ordered distribution of diol and diepoxide, monomer addition will be sequential so that a block of the first diol and a particular diepoxide will first be produced and then a second diol and diepoxide will be added to form second blocks grafted to the first block.

The proportion of each differing diol and diepoxide monomeric unit present in the addition reaction oligomers may vary from about a two percent equivalent to about a 98 percent equivalent, the equivalent being determined by dividing the molecular weight of the diol or diepoxide by the number of hydroxyls or epoxide groups respectively present. Preferred proportions for diol monomeric units, when a mixture of Diols D1 and D2 is combined, may be from one quarter to almost 100 percent equivalent of Diol D2. Preferred proportions for the diepoxide monomeric units, when a mixture of Diepoxides is combined, is from twenty percent equivalent to about ninety percent equivalent of Diepoxide E1, ten percent equivalent to about ninety-five percent equivalent of Diepoxide E2, and five percent equivalent to about sixty percent equivalent of Diepoxide E3. Appropriate adjustment of the proportion of the remaining Diol and Diepoxide of the mixture being employed is made to yield an equivalent proportion of 100 percent for diol monomer and diepoxide monomer. The ratio of diol monomer total equivalent to diepoxide monomer total equivalent is preferred to be slightly less than a stoichiometric equivalent of diol monomer total relative to the diepoxide monomer total so that epoxide groups terminate the epoxide compound.

The oligomeric molecular weight of the epoxide compounds will be from about 900 to about 4000. The ratio of the sum of diol monomer equivalents to the sum of diepoxide monomer equivalents used for the addition reaction to form the oligomers will be calculated so as to yield a molecular weight within this range. The equivalence of diol or diepoxide is calculated by dividing the molecular weight of diol or epoxide by the number of hydroxyl or epoxide groups present in the respective molecule. The range of equivalent diol:-diepoxide ratios appropriate for generation of this molecular weight range will be from 1:1.2 to 1:3. The preferred molecular weights lie in the range of from about 1800 to 2800 and especially preferred are molecular weights of about 2000 to 2500. The ratio of diol to diepoxide equivalents which produces these preferred molecular weights will be from about 1:1.4 to 1:1.6. Appropriate adjustment of the ratio and reaction conditions will also effect the molecular weight and sequence of the diols and diepoxides present in the oligomers. Those of skill in the art will understand the variations and the effects they have upon the oligomeric character.

Generally the extent of addition will increase with both the time and temperature of the reaction so that the desired molecular weight will be achieved through use of periods of about 2 to 4 hours and temperatures of about 140° to 170° C. However, the reaction usually is self-limiting so that further time or temperature adjustment will not increase the limiting molecular weight.

Lewis bases are generally used as catalysts to promote the addition of the diol monomers to the diepoxide monomers. It is preferred to use a triaromatic phosphine such as triphenyl phosphine as well as tetraalkyl phosphonium salts.

General organic solvents typically are used as a reaction medium for the production of the addition reaction oligomer epoxide compound. Included are such exemplary solvents as aliphatic ketones, for example methyl ethyl ketone or methyl isobutyl ketone as well as aromatic solvents like toluene or xylene, polyethers and glycol ethers, and also alcohols.

According to the invention, the epoxide compounds are converted to the corresponding amine resins which constitute one of the four primary components of the electrodeposition compositions. The amine resins are formed by reaction of an amine with the epoxide compounds. The amine opens the epoxide rings and forms a terminating group thereon which will act as a protonation and solubilization site for the amine resins.

The especially preferred embodiments of the amine resins constitute the following series of compounds.

I. The D2E amine resin is produced from reaction of the D2E epoxide compound.

II. The 2D2E amine resin is produced from reaction of the 2D2E epoxide compound.

III. The 2D3E amine resin is produced from the reaction of the 2D3E epoxide compound.

IV. The 2DE amine resin is produced from the reaction of the 2DE epoxide compound.

V. The D3E amine resin is produced from the reaction of the D3E epoxide compound.

VI. The DEE amine resin is produced from the reaction of the DEE epoxide compound.

VII. The 2DEE amine resin is produced from reaction of the 2DEE epoxide compound.

In similar fashion, the preferred embodiments of the amine resins of the invention constitute the reaction products of the preferred epoxide compounds and an amine.

The diepoxide and diol monomeric units present in the amine resins contribute adhesiveness, strength and flexibility to the amine resins when they are deposited on the substrate surface. These monomeric units also contribute to a more uniform flow of the coating during baking and bond the film to the substrate. In general, it is believed that the backbone structures of the epoxide compounds (i.e., the precursors for the amine resins) and the corresponding amine resins are substantially linear and the pendant groups, e.g., $R^1$, provide moderate side chain steric interaction; however, little if any polymeric branching is present. The combination of a linear backbone and side chain branching character is believed to contribute in part to the flexibility, lowered glass transition temperature and lowered melt viscosity of the amine resins of the invention.

The kinds of amines useful for formation of the amine resins include ammonia, and mono- and poly- primary, secondary, and tertiary amines as well as mono- and poly- amines containing mixtures of primary, secondary and tertiary amine groups. Heterocyclic amines and physical blends or chemical mixtures of these amine embodiments may also be used. Optionally, these amines may contain other functional groups such as hydroxyl, amide, carboxylic acid, ether, thio, thioether or alkoxy groups. The amine may preferably contain from one to five amine groups. When tertiary amine groups are present, primary or secondary amine groups will also preferably be present. The organic radicals substituting the mono or poly- primary, secondary or tertiary amine may be aliphatic, saturated, unsaturated, aromatic or alkaromatic alicyclic aromatic-substituted aliphatic, aliphatic-substituted aromatic or heterocyclic in nature. Generally, the aliphatic groups may be alkyl or alkenyl groups having from one to ten carbon atoms. The aromatic groups may be mono or polyphenylene groups or naphthalene groups having optionally substituted thereon one or more lower alkyl or lower alkoxy groups. When polyamines are employed, amine groups may both terminate the amine compound and may be present within the chain structure of the amine compound. Exemplary of suitable aliphatic and alicyclic diamines are the following: 1,2-ethylene diamine, 1,2-propylene diamine, 1,8-menthane diamine, isophorone diamine, propane-2,2-cyclohexyl amine, and triethylene tetramine.

Mixed amines in which the radicals are different such as, for example, aromatic and aliphatic can be employed and the other optional groups mentioned above can be present attached to the organic radicals additionally, such substituents as oxygen, sulfur, halogen or nitroso may also be present.

Aromatic diamines such as the phenylene diamines and the toluene diamines can be employed. Exemplary of the aforesaid amines are: p-phenylene diamine and p-toluene diamine. N-alkyl and N-aryl derivatives of the above amines can be employed such as, for example, N,N'-dimethyl-o-phenylene diamine, N'N'-di-p-tolyl-m-phenylene diamine, and p-aminodiphenylamine.

Polynuclear aromatic diamines can be employed in which the aromatic rings are attached by means of a valence bond such as, for example, 4,4'-biphenyl diamine, methylene dianiline and monochloromethylene diamine.

The use of amines dissolved in ketones is sometimes desirable because of better control over reaction conditions.

Besides the amines mentioned above, hydrazines and hydrazides can also be employed.

Aminoalcohols, mercapto-terminated derivatives and mixtures thereof, and the like and amino acids can also be employed as the amine. Examples are: monoethanolamine, 4-aminobenzoic acid, aminopropionic acid, N-(hydroxyethyl) ethylene diamine, antheanilic acid, p-aminophenol, aminostearic acid, and beta-aminobutyric acid. When amino acids are used, appropriate conditions should employed to release reactive amine groups from Zwitterion complexes.

Further typical amines used to prepare the amine resins include dialkylmonoamines of 1 to 6 carbons in each alkyl group; hydroxyalkyl alkyl amines, dihydroxyalkylamines having from 1 to 6 carbons in each alkyl group; di, tri, tetra and penta amines optionally substituted with alkyl groups of 1 to 6 carbon atoms; aromatic amines such as benzyl amine, alkyl substituted benzyl amine; substituted anilines wherein the substituent is an alkyl group of 1 to 6 carbon atoms; and nitrogen heterocycles such as pyridine, morpholine, quinoline and the like. Specific examples include methylethanolamine, diethanolamine, triethylenetetraamine, diethylenetriamine and the like The syntheses of the amine resins follow any of three synthetic procedures for addition of amine groups to epoxides to form terminating groups on epoxy resins. These synthetic procedures are generally known in the art and include the conventional stoichiometric amine addition procedure, the "excess amine" procedure and "the diketimine" procedure.

In the conventional stoichiometric procedure, approximately stoichiometric amounts of amine and epoxide compound are combined in an inert, water-miscible organic solvent or an organic solvent mixture such as alcohol, methyl isobutyl ketone xylene, toluene, glycol ethers and gently heated to produce amine addition to the terminal epoxide groups of the epoxide compound. These procedures are known in the art; see for example U.S. Pat. Nos. 3,984,299 and 4,031,050, the disclosures of which are incorporated herein by reference.

In the excess amine procedure, approximately an 8 to 12 fold excess of the amine on a molar basis is combined with the epoxide compound in aprotic, nonpolar solvent and gently heated to effect addition of the amine to the epoxide groups of the epoxide compound. In this procedure, the presence of excess amine promotes the addition of primary amines and suppresses the self-addition of amine resin to the epoxide compounds. Upon completion of the reaction, the excess amine is removed by vacuum steam distillation or other similar appropriate procedure. These procedures are known in the art; see for example, U.S. Pat. Nos. 4,093,594, 4,116,900, 4,134,864, 4,137,140, the disclosures of which are incorporated herein by reference.

In the diketimine procedure, a polyamine is typically used where primary and secondary amine groups are both present. The primary amine groups are protected as ketimines by reaction of the amine compound with a ketone. The secondary amine groups of the diketimine then react with the epoxide groups of the epoxide compound. According to this procedure about a stoichiometric amount of diketimine is combined with the epoxide compound in inert organic solvent and gently heated until the reaction is completed. After isolation of the amine resin, the ketimine groups may be removed by acid hydrolysis or by aqueous hydrolysis upon standing in water. These procedures are known in the art; see for example, U.S. Pat. No. 3,947,339, the disclosure of which is incorporated herein by reference.

The principal resin emulsions of the invention comprise a mixture of the foregoing amine resins, crosslinking agents and a solubilizing portion of aqueous acid. The preferred ratio by weight of amine resins to crosslinking agents in the principal resin emulsions may be from about 2:3 to about 5:1. The amount of water added to the principal resin emulsions is an amount sufficient to provide a solids content of from about 10% to about 65% by weight.

The crosslinking agents used in the principal emulsions according to the invention are blocked organic polyisocyanates or poly (beta hydroxy or alkoxy) esters or other activated polyester compounds, aminoplast resins or phenoplast resins. In the practice of this invention, it is preferred to use the blocked organic polyisocyanates as crosslinking agents.

All of these crosslinking agents are stable at room temperature but when heated decompose into compounds which have functional groups that are highly reactive with alcohol and amine moieties. The crosslinking agents contain a multiple number of such inchoate groups and will react multiple times with the amine resins during hardening so as to crosslink the resins into three dimensional matrices.

Typical aminoplast and phenoplast resins used in the art, as disclosed in U.S. Pat. No. 4,139,510, the disclosure of which is incorporated by reference, can be used as crosslinking agents in the practice of this invention. Suitable aminoplast resins are the reaction products of ureas and melamines with aldehydes further etherfied in some cases with an alcohol. Examples of aminoplast resin components are urea, ethylene urea, thiourea, melamine, benzoguanamine and acetoguanamine. Aldehydes useful to form aminoplast resins include formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea-formaldehyde resins, hexamethoxymethyl melamine, methylated polymeric melamine-formaldehyde resins, and butylated polymeric melamine-formaldehyde resins. Aminoplast resins and their method of preparation are described in detail in "Encyclopedia of Polymer Science and Technology", Volume 2, pages 1-19, Interscience Publishers (1965), the disclosure of which is incorporated by reference.

Phenoplast resins used as crosslinking agents according to the invention are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenoplast resins are phenol, o.m. or p-cresol, 2,4-xylenol, 3,4-xylenol, 2,5-xylenol, cardanol, p-tert-butyl phenol, and the like. Aldehydes useful in this reaction are formaldehyde, acetaldehyde and propionaldehyde. Particularly useful phenolplast resins are polymethylol phenols wherein the phenolic group is etherified with an alkyl, e.g. methyl or ethyl, group. Phenoplast resins and their methods of preparation are described in detail in "Encyclopedia of Polymer Science and Technology", Volume 10, pages 1-68, Interscience Publishers (1969), the disclosure of which is incorporated by reference.

Sufficient quantities of aminoplast and phenoplast resins are used in the cathodic electrocoat resin compositions to produce sufficient crosslinking of the modified epoxypolyamine adduct-fatty acid reaction monoepoxide product upon baking or curing. Typically, the amount of aminoplast or phenoplast resin used in the practice of this invention is about 15 weight percent to about 40 weight percent and preferably about 20 weight percent about 40 weight percent.

The preferred crosslinking agents used in the practice of this invention are the organic polyisocyanates and, in particular, the blocked polyisocyanates. The organic polyisocyanates and the blocking agents used in the practice of this invention are typical of those used in the art, e.g. U.S. Pat. No. 4,182,831, the disclosure of which is incorporated by reference.

Useful blocked polyisocyanates are those which are stable in the electrodeposition compositions and baths at ordinary room temperatures and which react with the amine resin of this invention at elevated temperatures.

In the preparation of the blocked organic polyisocyanates, any suitable organic polyisocyanates can be used. Representative examples are the aliphatic compounds such as trimethylene, tetramethylene, pentamethylene, hexamethylene, 1,2-propylene, 1,2-butylene, 2,3-butylene and 1,3-butylene diisocyanates: the aliphatic-aromatic compounds such as 4,4'-diphenylene methane, 2,4- or 2,6-tolylene, or mixtures thereof, 4,4'-toluidine and 1,4-xylylene diisocyanates; the 1,3,5-triisocyanate benzene and 2,4,6-triisocyanate toluene; and the tetraisocyanates such as 4,4'-diphenyl-dimethyl methane -2,2', 5,5' tetraisocyanate; the polymerized dimers and trimers, polymethylenepolyphenylene polyisocyanates having NCO functionalities of 2 to 3 and the like.

In addition, the organic polyisocyanate can be prepolymer derived from a polyol such as glycols, e.g., ethylene glycol and propylene glycol, as well as other polyols such as glycerol, trimethylolpropane, hexanetriol, pentaerythritol, and the like as well as monoethers, such as diethylene glycol, tripropylene glycol and the like and polyethers, i e., alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, 1,3-butylene glycol, 1,6-hexanediol, and their mixtures; glycerol trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Preferred polyisocyanates include the reaction product of toluene diisocyanate and trimethylolpropane; additionally, the isocyanurate of hexamethylene diisocyanate.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, and the like; the aromatic -alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol.

A preferred blocking agent is monopropyl ether of ethylene glycol. Additional blocking agents include tertiary hydroxyl amines, such as diethylethanolamine and oximes, such as methylethyl ketoxmine, acetone oxime and cyclohexanone oxime, and caprolactam. A preferred oxime is methyl-n-amyl ketoxime.

The blocked polyisocyanates are formed by reacting sufficient quantities of blocking agent with sufficient quantities of organic polyisocyanate under reaction conditions conventional in this art such that no free isocyanate groups are present when the reaction has run its course.

The blocked organic polyisocyanates generally are known in the art and are described in U.S. Pat. Nos. 3,799,854; 3,984,299 and 4,031,050, the disclosures of which are incorporated herein by reference. Additional blocked polyisocyanates are described in U.S. Pat. No. 4,605,690 the disclosure of which is incorporated herein by reference. Typically, a blocked polyisocyanate is formed by the combination of an aliphatic polyol such as trimethylol propane or pentaerythritol, a diisocyanate such as toluene diisocyanate and a mono-alcohol such as the monohexyl ether of ethylene glycol as the isocyanate blocking group. Such an exemplary blocked polyisocyanate typically will deblock at temperatures of from about 125° to about 190° C.

The poly (beta hydroxy) esters or activated poly esters are generally known as transesterification agents. These materials are polyesters which have alkylene glycol alkylene glycol monoether, alkylene glycol monoester or similar moieties as the esterifying group. Upon heating the glycol portion of the ester is lost and the resulting acid moiety reacts with amine or alcohol groups of the amine resin. Usually the polyester moiety of the beta-hydroxy or beta-activated esters will be a high molecular weight aliphatic polyacid. Examples generally are poly (2-hydroxyalkyl) esters of polycarboxylic acids. The polycarboxylic acids include, for example, azelaic acid, terephthalic acid, succinic acid and aliphatic di or tricarboxylic acids of 4 to 12 carbons. Alcohols include ethylene glycol, glycerol, trimethylol propane, pentaerythritol and the like. These transesterification agents are described in U.S. Pat. Nos. 4,397,990; 4,401,774; 4,362,847; 4,352,842; 4,405,703; 4,405,662; 4,423,167; 4,423,169; 4,489,182, the disclosures of which are incorporated herein by reference.

The pigment-grind resin formulations employed in the electrodeposition compositions of the invention are typical and generally known. The pigment usually will comprise carbon black, titanium dioxide, strontium dioxide and other pigments necessary for the production of color. The grind resins are amine derivatives of epoxy resins of appropriate molecular weight which will permit the grind resins to function both as surfactant-like compounds and as resinous materials which will combine with the crosslinkers of the deposited films.

Typical grind resins useful in this regard include the "quaternary" ammonium salts generally disclosed in U.S. Pat. Nos. 3,962,165; 4,071,428; 4,530,945; 3,925,180; and 3,936,405 and the "castor oil" grind resins disclosed in U.S. Pat. No. 4,612,338, the disclosures of which are incorporated herein by reference. The procedures, parameters and conditions for preparing the pigment-grind resin formulations and the proportions and amounts of ingredients necessary are those typically used and known in the art. As is appropriate, dibutyl tin oxide is also incorporated into pigment grind resin formulation. This ingredient is important for promotion of the crosslinking reaction upon baking.

The aqueous electrodeposition compositions are formed from the combination of the principal emulsions, the pigment-grind resin formulations and water to provide a solid content of from about 10% to about 65% by weight. The ratio of weights of the pigment-grind resin formulations to the principle resin emulsions are from about 1:10 to about 2:5. The pH of the electrodeposition compositions may be from about 2 to about 8.5 and the ratio by weight of the amine resins to crosslinking agents in the electrodeposition compositions may be from about 2:3 to about 5:1. Likewise the ratio of the pigment to grind resins is from about 2:1 to about 6:1.

Generally, the principal resin emulsions and pigment-grind resin formulations are combined to form the electrodeposition compositions shortly before use in the electrodeposition baths. The electrodeposition compositions may be further diluted with water and other components such as coalescing agents, anti-cratering agents, film build agents, surfactants, antipitting agents and the like to produce the baths. Sufficient quantities of the principal resin emulsions and pigment-grind resin formulations are used so that the coating produced on a substrate in the baths will have sufficient thickness so that baking will provide such desired characteristics as a smooth surface, high build and be effective in a low temperature cure. In addition, the bath proportions of compositions should enable short coating time at a low temperature.

The electrodeposition process typically takes place in an electrically insulated tank containing an electrically conducting anode which is attached to a direct current source. The size of the tank will depend on the size of article to be coated. Typically, the tank will be constructed of stainless steel or mild steel lined with a dielectric coating such as epoxy impregnated fiberglass or polypropylene. The typical size of an electrodeposition tank used for such articles as automobile or truck bodies will be designed to contain from about 240,000 to about 500,000 liters of electrodeposition bath.

Adjustment of deposition parameters such as voltage, the time, the bath temperature, the percent solids content, the acidity and the like of the aqueous electrodeposition bath in the dip tank will promote appropriate deposit of the desired film. To this end, a period of immersion of about 1 minute to about 4 minutes and a DC voltage for the electric current of about 100 volts to about 500 volts and a percent solids in the bath of about 18% to about 30% are used with 350 volts voltage, 82° F. temperature, 2 minute period of immersion and 20 percentage of solids being preferred.

After the films have been produced by the electrodeposition process, the film-coated substrate bodies are removed from the dip tank and the excess bath solids are rinsed off. The film-coated substrate bodies are then placed into an oven where they are cured or hardened. In general, the film-coated substrate bodies are heated to a temperature from about 300° F. to 400° F., preferably 325° F. to about 350° F. for a period of approximately 20 to about 25 minutes to effect the hardening or crosslinking reaction. During this process, the film viscosity of the resin systems according to the invention decreases as a result of the higher temperature and the low film melt viscosity and the films made according to the invention flow so as to provide a uniform coverage of all areas and surfaces of the substrate body. As the crosslinking reaction proceeds, film flow ceases and the films eventually become hardened coatings adhering to the substrate bodies. The hardened coating thickness produced according to the invention lies in the range of from about 16 microns to about 36 microns.

While the hardened coatings derived from the preferred and especially preferred classes of amine resins of the invention typically can produce film thicknesses in the range of about 16 microns to about 24 microns or higher, the hardened coatings derived from the first and seventh especially preferred classes of amine resins of the invention, that is, the D2E and 2DEE amine resins, typically will produce "thick build" coatings of about 26 to about 36 microns. These coatings are substantially thicker than the standard build coatings typically produced by amine resin-blocked diisocyanate technology practiced according to known cathodic electrodeposition processes. Moreover, it is surprising that such "thick build" coatings can be produced in this fashion since known "thick build" producing components such as surfactants and polyester diols are not incorporated in these electrodeposited films according to the invention. Thus, while an increased film thickness is produced by several of the resin systems of the invention, they do not employ a complex additive mixture for increase of the film build.

The corrosion resistance of the hardened coatings produced by the resin coatings of the invention also are superior, improved and unexpected relative to the standard build coatings produced from amine resins and blocked diisocyanates typically employed in cathodic electrodeposition technology. Generally, it has been found in scribe or scab test procedures utilizing metallic panel plates that under a 20 cycle, 20 day test, involving both humid, hot, cold, dry and salty atmospheres, that a corrosion spread on the order of 2 to 12 millimeters occurs when hardened resin coatings according to the invention are used. Especially preferred in this regard is the hardened coating produced from the 2DEE amine resin. This coating has a corrosion spread of from about 5 to 7 millimeters.

It is believed that the unexpectedly improved corrosion resistance found for the coatings of the invention is attributable to the better adhesiveness, lowered glass transition temperature, lowered melt viscosity, flexibility and properties of the amine resins of the invention. The improved adhesiveness prevents coating undercutting by corrosive materials such as salt and moisture and prevents peel-up of the hardened coatings from the substrate body. The presence of aliphatic groups within and aliphatic pendant groups from the backbones of the amine resins lower the glass transition temperatures and the melt viscosities of the deposited films. Accordingly, the deposited films flow to a greater extent when they are being hardened and, after hardening, remain more flexible than hardened coatings containing all aromatic groups in the amine resin backbone.

The direct and reverse impact resistance (hereinafter impact resistance) of the coatings of the invention is also superior and unexpected relative to the standard build amine resin diisocyanate hardened coatings produced by cathodic electrodeposition according to the art. In these tests, the hardened coatings according to the invention produced impact resistance results from about 80 to 160 inch-pounds.

It is believed that the superior impact resistance properties are the result of the high adhesive character of the hardened coatings formed according to the invention. It is hypothesized that the increased number of hydroxyl groups per molecular weight of amine resin promotes strong binding of the hardened coatings to the substrate surface. This increased adhesiveness is believed to be the result of hydrogen or other similar bonding.

Increased film flexibility also is believed to contribute to direct and reverse impact resistance. The increased flexibility is believed to be derived from the presence of flexible alkyl and alkoxy units within the amine resin backbones. These saturated chain moieties do not impart the rigid film characteristics found for the amine resins of the "standard build" technology. They are more flexible and avoid the rigidity and brittleness effects which occur as a result of the use of all aromatic backbone amine resins.

Articles coated by the compositions according to the invention typically may be pretreated to remove impurities and typically are phosphatized. Galvanized metals are typical of the kinds of metallic substrates used; however, the superior corrosion resistivity and impact resistance of the electrodeposition coatings according to the invention permit the use also of bare steels without galvanized coatings. Consequently, cost savings are greatly facilitated in the manufacture of coated automobile and truck bodies.

The following examples are illustrative of the principles and practice of this invention but do not constitute limitations thereof. Parts and percentages used are parts and percentages by weight.

EXAMPLE 1

A D2E Epoxide

This general procedure was used to prepare a D2E epoxide compound. The following components were charged into a reaction vessel: the diglycidyl ether of 2,2-bis (p-butoxy-2-hydroxypropyloxy phenyl) propane, hereafter referred to as Compound A, the diglycidyl ether of Bisphenol A, Bisphenol A, and toluene. The charge was heated to 290° F. under a dry nitrogen atmosphere and 0.3 parts of triphenylphosphine were added to the reactor vessel. The reaction mixture was further heated to 300° F. and held for 2.25 hours or until the weight per epoxide value of the mixture was 1155. The reaction vessel was cooled to 280° F. and 25 parts of methylisobutyl ketone were charged to dilute the reaction mixture.

The following Table 1 lists the proportions of each component charged for Examples 1A, 1B and 1C. The addition reaction oligomers produced 1A, 1B and 1C were adducts of a Diol D1, Diepoxide E1 and Diepoxide E2.

TABLE 1

| | Compound A | Compound B | Bisphenol A | Toluene | MIBK |
|---|---|---|---|---|---|
| Example 1A | 120 | 80 | 60.8 | 13.7 | 25 |

TABLE 1-continued

| | Compound A | Compound B | Bisphenol A | Toluene | MIBK |
|---|---|---|---|---|---|
| Example 1B | 540 | 360 | 273.6 | 61.8 | 432.7 |
| Example 1C | 450 | 317.5 | 232.5 | 65.0 | 60. |

EXAMPLE 2

A D3E Epoxide

This procedure prepared a D3E epoxide compound. The following components were charged into a suitable reaction vessel: 460 parts of compound A, 153 parts of the diglycidyl ether of Bisphenol A, 130 parts of resorcinol diepoxide, 257 parts of Bisphenol A, and 52 parts of toluene. The charge was heated to 150° C. under a dry nitrogen atmosphere and 0.5 parts of triphenylphosphine were added to the reaction vessel. The reaction mixture was heated to 150° C. for 2.33 hours or until the weight per epoxide value of the mixture was 1164. The mixture was cooled to 100° C. and 210 parts of methylisobutyl ketone was added to dilute it. The oligomer produced was an adduct of Diol D1 and Diepoxides E1, E2 and E3.

EXAMPLE 3

A 2DEE Epoxide

This procedure was used to prepare a 2DEE epoxide compound. The following components were charged to a suitable reactor vessel: compound A, resorcinol diepoxide, hydroquinone, Bisphenol A, and toluene. The charge was heated to 285° F. under a dry nitrogen atmosphere and 0.4 parts of triphenylphosphine were added to the reactor vessel. The reaction mixture was heated to 290° F. and held for two hours or until the weight per epoxide value was 1151. The reaction mixture was cooled to 225° F. and 45.2 parts of methylisobutyl ketone were added to dilute it.

The aforementioned procedure and the quantity of components listed in table 2 were used to synthesize the epoxides. The oligomers products, 3A and B were adducts of Diols D1 and D2 and Diepoxides E2 and E3.

TABLE 2

| | Weight (in parts) | | | | |
|---|---|---|---|---|---|
| Resin | Compound A | Resorcinol diepoxide | Hydroquinone | Bisphenol A | Toluene |
| Example 3A | 368 | 233 | 40 | 158.3 | 42.6 |
| Example 3B | 368 | 280.5 | 120 | 33.3 | 43.6 |

EXAMPLE 4

A 2DE Epoxide

This procedure was used to prepare a 2DE epoxide compound. The following components were charged into a suitable reaction vessel: 300 parts of the diglycidyl ether of Bisphenol A, 60 parts of Bisphenol A, 18 parts of hydroquinone, and 19.9 parts of toluene. The charge was heated to 295° F. under a dry nitrogen blanket and 0.4 parts of triphenylphosphine were added to the reactor vessel. The reactor mixture was further heated at 310° F. for a period 2.5 hours or until the weight per epoxide value was 1197. The mixture was diluted with 51.6 parts of methylisobutyl ketone. The oligomer produced was an adduct of Diols D1 and D2 and Diepoxide E1.

EXAMPLE 5

A DEE Epoxide

This procedure was used to prepare a DEE epoxide compound. The following components were charged into a suitable reaction vessel: 332.7 parts of compound A, 182 parts of resorcinol diepoxide, 196 parts of Bisphenol A, and 36.8 parts of toluene. The reaction mixture was heated to 300° F. under a dry nitrogen atmosphere and 0.4 parts of triphenylphosphine were added to the reaction vessel. The mixture was further heated at 300° F. for five hours or until a weight per epoxide value of 1162 was attained. The reaction mixture was cooled to 210° F. and 41 parts of methylisobutyl ketone was added to dilute it. The oligomer produced was an adduct of Diol D1 and Diepoxides E2 and E3.

EXAMPLE 6

A 2D2E Epoxide

This procedure was used to prepare a 2D2E epoxide compound. The following materials were charged to a suitable reaction vessel: 294 parts of Compound A, 267 parts of the diglycidyl ether of Bisphenol A, 35 parts of hydroquinone, 106.3 parts of Bisphenol A, and 37 parts of toluene. The reaction mixture was heated to 300° F. under a dry nitrogen atmosphere and 0.4 parts of triphenylphosphine were added to reaction vessel. The mixture was further heated at 300° F. for 3.3 hours or until a weight per epoxide of 1154 was obtained. The reaction mixture was cooled to 230° F. and 41 parts of methylisobutyl ketone was added to dilute it. The oligomer produced was an adduct of Diols D1 and D2 and Diepoxides E1 and E2.

EXAMPLE 7

A 2D3E Epoxide

This procedure was used to prepare a 2D3E epoxide compound. The following components are charged to a suitable reaction vessel: 130 parts of Compound A, 130 parts of resorcinol diepoxide, 100 parts of the diglycidyl ether of Bisphenol A, 115 parts of Bisphenol A, 25 parts of hydroquinone, and 25 parts of toluene. The reaction is heated to 300° F. under a dry nitrogen atmosphere and 0.3 parts of triphenylphosphine are added to the reaction vessel. The mixture is further heated for three hours at 300° F. or until a weight per epoxide of 1146 is attained. The reaction mixture is cooled to 210° F. and 25 parts of methylisobutyl ketone are added to dilute it. The oligomer produced was an adduct of Diols D1 and D2 and Diepoxides E1, E2 and E3.

EXAMPLE 8

Diketimine Adduct

To a suitable reaction vessel equipped with an agitator, a condensor with a water trap, and a nitrogen line was charged: 1,987 parts of diethylenetriamine and 5,788 parts of methylisobutyl ketone. The mixture was refluxed under a dry nitrogen atmosphere at a temperature <280° F. Water (695 parts) was removed periodically until no more is collected. The mixture was further heated at reflux for one hour and then cooled.

EXAMPLE 9

A Reference ED Epoxide

To a suitable reaction vessel the following components were charged: 1,271.4 parts of the diglycidyl ether of Bisphenol A, 455.9 parts of polycaprolactone diol, 345.6 parts of Bisphenol A, and 63.3 parts of xylene. The mixture was heated to 290° F. under a dry nitrogen atmosphere and 2.8 parts of benzyldimethylamine were added. After the exotherm the mixture was heated at 320° F. for 30 minutes or until the weight per epoxide was 650. The reaction was cooled to 260° F. and a second charge of benzyldimethylamine was added. The vessel was further heated at 260° F. until a weight per epoxide of 1150 was obtained. The polymer of Example 9 (1565.4 parts) was quickly added cooling the reactor temperature to 200-210° F. The amine of Example 8 (128.3 parts) was added to the mixture followed by 103.1 parts of methylethanolamine. The reaction mixture was heated to 240° F. for one hour. Hexylcellosolve (132.8 parts) was added to dilute the mixture.

EXAMPLE 10

Ordered DEE Epoxide 1

To a suitable reaction vessel was charged the following components: 213.7 parts of resorcinol diepoxide, 227.3 parts of Bisphenol A, and 50 parts of toluene. The mixture was heated to 150° C. under a dry nitrogen atmosphere and 0.4 parts of triphenylphosphine were added. After the exotherm the mixture was further heated at 150° C. for 2.5 hours. The reaction vessel was cooled to 130° C. and 30.1 parts of toluene were added. After cooling to 120° C., 361 parts of compound A was added. The mixture was heated to 150° C. and held at that temperature for two hours or until a weight per epoxide of 1270 was obtained. The mixture was diluted with 100 parts of methylisobutyl ketone.

EXAMPLE 11

Ordered DEE Epoxide 2

To a suitable reaction vessel was charged the following components: 361.8 parts of Compound A, 227.4 parts of Bisphenol A, and 56 parts of toluene. The mixture was heated to 150° C. and 0.4 parts of triphenylphosphine were added. The mixture was further heated at 150° C. for two hours. The vessel was charged with 213.9 parts of resorcinol diepoxide an 40.9 parts of toluene. The vessel was further heated at 150° C. for three hours or until weight per epoxide of 1100 was obtained. The mixture was diluted with 100 parts of methylisobutyl ketone.

Example 12

Stoichiometric Amine Resin Preparation

A suitable reaction vessel containing the upgraded epoxide compound from Example 1-7 was placed under a dry nitrogen atmosphere and heated to 200°-220° F. Methylethanolamine (MEOA) was charged to the flask under agitation and further heated at 200°-220° F. for a period of 2.5 hours. Methylisobutyl ketone was charged to dilute the mixture.

Using the aforementioned procedure the quantity of epoxide compound and MEOA amine listed in Table 3 was used to synthesize the amine resin examples 12A-12H which correspond to the epoxide compounds of Examples 1-7.

TABLE 3

| Amine Resin | Amine Resins Epoxide from Example | Epoxide Parts | MEOA (parts) | MIBK (parts) |
| --- | --- | --- | --- | --- |
| 12A (D2E) | Example 1A | 299.8 | 16.9 | 110.8 |
| 12B (D3E) | Example 2 | 1052.5 | 65 | 528 |
| 12C (2DEE) | Example 3A | 888.1 | 52.1 | 369.6 |
| 12D (2DEE) | Example 3B | 890.9 | 52.1 | 370.7 |
| 12E (2DE) | Example 4 | 449.5 | 23.7 | 104.2 |
| 12F (DEE) | Example 5 | 778.6 | 44.9 | 323.7 |
| 12G (2D2E) | Example 6 | 739.7 | 45.7 | 324.8 |
| 12H (2D3E) | Example 7 | 500 | 32.6 | 187 |

EXAMPLE 13

"Excess Amine" Amine Resin Preparation

A conventional reactor equipped with an agitator, a dry nitrogen line, and a condensor was charged with 950 parts of triethylenetetramine. The triethylenetetramine was heated 55° F. Then, 1634.7 parts of the adduct of Example 1B were charged to the vessel and heated to 200° F. for one hour. Next, the excess amine in the reactor mixture was vacuum distilled, condensed, and removed by applying a vacuum of 75 mm Hg and slowly raising the temperature to 470° F. over four hours. The mixture was held at the temperature until no more distillate was coming out. The temperature was then lowered to 300° F. and 158.7 parts of pelargonic acid along with 125 parts of xylene were added to the reaction vessel. The reaction mixture was heated to 410° F. and held at reflux until the acid value was down 3.2. Then the reaction mixture was cooled to 270° F. and 648.8 parts of methylisobutyl ketone were added to dilute it.

EXAMPLE 14

"Ketimine" Amine Resin Preparation

A suitable reaction vessel equipped with a dry nitrogen line, thermometer, and agitation was charged with 1066 parts of the adduct of Example 1C. The mixture was heated to 100° C. The diketimine of diethylenetriamine (152.6 parts) and methylethanolamine (31.3 parts) were charged to the vessel and heated at 120° C. for one hour. The mixture was cooled and diluted with methylisobutyl ketone to 65% N.V.

EXAMPLE 15

Blocked Diisocyanate Cross-Linking Agent

The primary crosslinking agent was prepared by slowly charging 870 parts of trimethylolpropane into a suitable reactor vessel containing 3387 parts of an 80/20 isomer mixture of 2,4-/2,6-toluene diisocyanate, 1469 parts of methylisobutyl ketone, and 2 parts of dibutyl tin dilaurate under agitation with an nitrogen blanket. The reaction was maintained at a temperature below 110° F. The charge was held an additional one and one-half hours at 110° F. and then heated to 140° F. at which time 2026 parts of ethylene glycol monopropyl ether was added. The charge was maintained at 210° F. to 220° F. for one and one-half hours until essentially all of the isocyanate moiety was consumed as indicated by infrared scan. The batch was then thinned with 2116 parts of methyl isobutyl ketone.

EXAMPLE 16

Blocked Diisocyanate Cross-Linking Agent

An 80/20 mixture of 2,4/2,6-toluene diisocyanate (2949 parts) was charged to a suitable reaction vessel under a dry nitrogen atmosphere. 2-Ethylhexanol (2209.4 parts) was added to the vessel under agitation at a suitable rate to keep the vessel temperature below 120° F. After the addition is complete, the mixture is stirred for 30 minutes or until an isocyanate equivalent weight of 285-325 is obtained. Dibutyltin dilaurate (0.9 parts) was charged to the vessel and the mixture was heated to 150° F. Trimethylolpropane (264.7 parts) was added at a suitable rate to keep the temperature below 250° F. After addition, the mixture was further heated at 250° F. for 1.5 hours. A mixture of methylisobutyl ketone (2282.4 parts) and n-butanol (253.6 parts) was charged to the vessel to dilute the mixture.

EXAMPLE 17

Castor Oil Grind Resin

The grind vehicle was prepared by adding the following components to a suitable reactor vessel: 2280 parts of Iris (glycidyl ether) of castor oil Epi-Rez 505 TM (WPE° 600) manufactured by Celanese Corporation, Louisville, Ky., to a mixture of 331 parts of monobutyl ethylene glycol ether, and 619 parts of polyglycolamine H-163, at 77° C. for 1.5 hour. The reaction temperature was held at 115° C. for one hour.

EXAMPLE 18

Pigment Paste

A pigment paste was prepared by grinding 123 parts of the grind vehicle of Example 17, 8 parts of acetic acid, 252 parts of deionized water, 4 parts of dibutyl tin oxide, 17 parts of carbon black, 56 parts of lead silicate, and 145 parts of clay in a suitable mill for about one-half hour until the average particle size was less than about 12 microns, (at ambient temperature).

EXAMPLE 19

Pigment-Grind Resin Foundation

The products of example 19 and Example 20 are the two intermediates for the grinding vehicle. Example 19 was prepared by charging ethylene glycol monopropyl ether to 2,6-toluene diisocyanate under agitation with a dry nitrogen blanket. The reaction was maintained at a temperature below 100° F. The charge was held an additional one and one-half hour.

EXAMPLE 20

Grind Resin

In a suitable reactor vessel, 455 parts of a alkylaryl polyether alcohol (Triton X-102TM manufactured by Rohm and Haas, Philadelphia, Pa.) and 51 parts of methyl isobutyl ketone previously azeotroped to remove water, were added to 109 parts of 2,4-toluene diisocyanate. The reaction was maintained at 115° F. for 2 hours. Then 56 parts of dimethyl ethanolamine were charged, and the reaction was maintained at 160° F. for 1 hour. Finally, 50 parts of ethylene glycol monobutyl ether, 75 parts of lactic acid, and 89 parts of deionized water were charged, and the reaction was held at 190° F. for one hour.

EXAMPLE 21

Grinding Vehicle

The grinding vehicle was prepared by charging 88 parts of the adduct of Example 19 to a reaction vessel containing 206 parts of diepoxy adduct of bisphenol A and its bisglycidyl ether EPON 1002F(WPE° 650 manufactured by Shell Chemical Co., Houston, Tex.) and 39 parts of methyl isobutyl ketone. The reaction temperature was maintained at 250° F. for one hour. Ethylene glycol monobutyl ether, 186 parts, and the adduct of Example 20, 381 parts, were added. The batch was maintained at 180° F. for four hours.

EXAMPLE 22

Pigment Paste

A pigment paste was prepared by grinding 1081.1 parts of Example 21, 2,208.5 parts of deionized water, 1,947.4 parts of clay, 272 parts of carbon black, 341.4 parts of lead silicate, and 77.6 parts of dibutyltin oxide in a steel ball mill for 15 minutes. Strontium chromate (172.4 parts) was blended into the mill. The mixture was ground for about 24 hours so the maximum particle size was 16 microns. An additional 324.8 parts of Example 21 and 116.8 parts of deionized water were added to the mill and ground for three hours.

EXAMPLE 23

Anti-Cratering, Flow Agent

The acrylic anti-cratering agent was prepared by charging 44 parts of butyl acrylic, 15 parts of hydroxyethyl acrylic, 15 parts of dimethylaminoethyl methacrylic, 2 parts of styrene, 1 part of octyl mercaptan, 4 parts of 2,2'-azobis-(2-methyl butyronitrile), (a polymerization initiator) Du Pont VAZO 67, and 3 parts of acetone to a refluxing mixture of 13 parts of methyl isobutyl ketone and 2 parts of acetone over a 4 hour period. After a 15 minute holding period, 0.14 parts of Du Pont VAZO 67 and 1 part of methyl isobutyl ketone was added. The batch was maintained at the refluxing temperature for another hour.

EXAMPLE 24

Principal Emulsion

Principal emulsions were prepared by adding 817.2 parts of the amine resin of Example 12, 411.2 parts of the crosslinker of Example 15, 18.3 parts of acetic acid, 22.9 parts of the acrylic flow agent of Example 23, 28.9 parts of phenyl cellosolve, and 449 parts of deionized water and high agitation for one hour. An additional 792 parts of deionized water was added. After agitation for two days, organic solvents were driven off.

Following the foregoing procedure, substituting the epoxy/amine resin adduct of Example 1A with epoxy/amine adducts of Examples 12B-12H and 14, principal emulsions incorporating the amine resins of Examples 12B-H, 14 were prepared as described in Table 4.

TABLE 4

| | Principal Emulsion No. | | | | | | | |
|---|---|---|---|---|---|---|---|---|
| | 23A | 23B | 23C | 23D | 23E | 23F | 23G | 23H |
| Amine Resin Example No. | 12B | 12C | 12D | 12E | 12F | 12G | 12H | 14 |
| Crosslinker | 386.6 | 431.8 | 421.0 | 431.9 | 393.2 | 417.3 | 420 | 426.1 |
| Acetic Acid (25%) | 76.0 | 82.8 | 91.2 | 84.9 | 74.3 | 71.5 | 71.5 | 102.8 |
| Phenyl Cellosolve | 28.0 | 30.1 | 29.4 | 29.9 | 27.4 | 29.1 | 30.0 | 29.0 |
| Deionized Water | 465 | 1416.5 | 1359.4 | 1311.7 | 1280.5 | 1455.3 | 1454.1 | 1428.5 |
| Resin | 750.0 | 831.6 | 809.6 | 817.3 | 775.6 | 831.6 | 834.2 | 844.5 |

EXAMPLE 25

Principal Emulsion

The principal emulsion was prepared by adding 619.8 parts of the amine resin of Example 13, 413.2 parts of the crosslinker of Example 16, 137.4 parts of polycaprolactone diol, 28.5 parts of the acrylic flow agent of Example 23, 9.1 parts of acetic acid, and 1165.3 parts under high agitation for one hour. After agitation for two days, organic solvents were driven off.

EXAMPLE 26

Reference Principal Emulsion

The polymer mixture of Example 9 (4071.4 parts) was charged into a suitable vessel containing 64.4 parts of 25% acetic acid, and 3,079.6 parts of deionized water over a 20 minute period with high agitation. The mixture was further stirred for one hour. An additional 1555.6 parts of deionized water was added.

EXAMPLE 27

Reference ED Bath

A cationic electrodepositable paint (bath) was prepared by blending 840 parts of deionized water, one part of 25% acetic acid, 1,388 parts of Example 26 and 264.8 parts of Example 22. An additional 706.2 parts of deionized water is added to the mixture. Bare cold-rolled steel and bare hot-dipped galvanized panels were plated at 325V. for two minutes gave smooth films of 0.6–0.8 mil. thickness after a 350° F. bake for 25 minutes.

EXAMPLE 28

Electrodeposition Baths

A cationic electrodepositable paint (bath) was prepared by blending 1523.6 parts of the principal emulsions of Example 25, 1,923.8 parts of deionized water, and 352.6 parts of the adduct of Example 26. The bath had a pH of 6.5 and a total solid content of 20%. Bare cold-rolled steel and bare hot-dipped galvanized panels were plated at 270V for two minutes gave smooth films of 0.9–1.0 mil thickness after a 325° F. bake for 25 minutes.

Using the foregoing procedure, the principal emulsions of Examples 23A–G were incorporated into electrodeposition baths and electrodeposited as described.

EXAMPLE 29

Corrosion Resistance Test

Electrodeposited panels of Example 28 were scribed and subjected to the 20 cycle GM scab corrosion test. One cycle consisted of a 24 hour period in which the coating was soaked in an ambient temperature 5% salt solution, dried and placed in 140° F./85% relative humidity cabinet A hot/cold cycle was incorporated into cycles 1, 6, 11, and 16 by which the panel was heated to 140° F. and then cooled to 15° F. After the 20 cycle scab test the panels were blown off with compressed air and were scraped to remove any loose coating.

Using the foregoing procedure of Example 29 and the electrocoated panels obtained from the paints of Example 28, the panels were evaluated as described in the foregoing procedure. Results are summarized in Table 5.

TABLE 5

| | Corrosion Resistance | |
|---|---|---|
| | Full Width Scribe Creep (mm) | |
| Electrocoat Bath | Bare Steel | Bare Galvanized |
| 28A | 6.6 | 7.6 |
| 28B | 6.7 | 5.7 |
| 28C | 6.6 | 5.5 |
| 28D | 12.1 | * |
| 28E | 7.4 | 5.0 |
| 28F | 6.5 | 7.2 |
| 28G | 6.8 | 3.4 |
| 27 | 9.7–10.3 | 4.2–4.9 |

*Result was not available.

We claim:

1. A 2DE epoxide compound comprising the addition reaction oligomer of monomers Diol D1, Diol D2 and Diepoxide E2 wherein:
   Diol D1 has at least two aryl groups between the hydroxyls,
   Diol D2 has only one aryl group between the hydroxyls, and
   Diepoxide E2 is a bis(glycidyl either) of a bis(labile hydrogen functionalized alkoxy) arylene.

2. A 2DE epoxide compound according to claim 1 wherein dio D1 is a bis(aryl alcohol) compound.

3. A 2DE epoxide compound according to claim 1 wherein Diol D2 is an aryl diol.

4. A 2DE epoxide compound according to claim 1 wherein:
   Diol D1 has the formula HO—Ar$^1$—OH, Ar$^1$ being a naphthalene group or a polyphenylene group having two or three phenylenes linked by carbon-carbon bonds or alkylene groups of 1 to 5 carbons, or a substituted derivative of said naphthalene or polyphenylene group, said substituent being halogen, alkoxy of 1 to 3 carbons, or alkyl of 1 to 3 carbons;
   Diol D2 has the formula HO—Ar$^3$—OH, Ar$^3$ being a phenylene or substituted phenylene, the substituent being halogen, alkoxy of 1 to 3 carbons, or alkyl of 1 to 3 carbons; and
   Diepoxide E1 has the formula

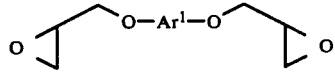

$Ar^1$ being as defined for Diol D1.

5. A 2DE epoxide compound according to claim 1 wherein the diepoxide monomer and diol monomers alternate in sequence in the oligomer and the distributions of Diepoxide E2, and Diols D1 and D2 in the oligomer are random.

6. A 2DE epoxide compound according to claim 1 wherein the diepoxide monomer and diol monomers alternate in sequence in the oligomer and the distribution of monomers is ordered so as to provide blocks of Diepoxide-Diol: E2-D1 and E2-D2.

7. A 2DE epoxide compound according to claim 1 wherein the ratio of Diol D1 and D2 equivalents to the sum of Diepoxide E2 equivalents is calculated to yield an oligomer molecular weight of from about 900 to about 4000, equivalents being the molecular weight of diol or diepoxide divided respectively by the number of hydroxyls groups or epoxide groups present in the diol or diepoxide.

8. A 2DE epoxide compound according to claim 1 wherein Diol D1 is p,p-dihydroxydiphenyl alkane of 1 to 3 carbons, p,p-dihydroxydiphenyl, 1,5-dihydroxynaphthalene or bis(hydroxynapthalene) methane and Diol D2 is resorcinol, hydroquinone or catechol.

9. A 2DE amine resin comprising the reaction product of:
   A) the 2DE epoxide compound of claims 1, 2, 3, 4, 5, 6, 7 or 8; and
   B) an amine.

10. An amine resin according to claim 9 wherein the amine is ammonia, a mono- or poly- organic amine having primary, secondary, or tertiary groups or combinations thereof, or a heterocyclic amine or a physical blend or chemical mixture of said amines.

11. An amine resin according to claim 9 wherein the amine contains hydroxy, ether, alkoxy, thio, thioether, carboxyl or amide groups.

12. An amine resin according to claim 9 wherein the amine is a mono or poly aliphatic, aromatic or alkaromatic amine having from 1 to 6 primary, secondary, tertiary groups or a combination thereof, or a heterocyclic amine.

13. A 2DE principal resin emulsion comprising water, an acid solubilized 2DE amine resin according to claim 9 and a cross-linking agent.

14. A principal emulsion resin according to claim 13 wherein the cross-linking agent is a blocked organic polyisocyanate.

15. An aqueous electrodeposition composition comprising a principal resin emulsion according to claim 13 and a pigment-grind resin formulation wherein the grind resin is a quaternary ammonium salt, or an esterified, alkoxylated aliphatic amine.

16. An aqueous electrodeposition composition according to claim 15 wherein the solids content is about 10% to about 65% by weight, the ratio of weight of pigment-grind resin formulation to the sum of the weights of amine resin and cross-linking agent is from about 1:10 to about 2:5; the pH is about 2 to 8.5, the ratio by weight of amine resin to cross-linking agent is from 2:3 to 5:1 and the ratio by weight of pigment to grind resin is about 2:1 to about 6:1.

17. A method of coating a substrate comprising cathodically electrodepositing onto the substrate a 2DE amine resin according to claim 9.

* * * * *

UNITED STATES PATENT AND TRADEMARK OFFICE
CERTIFICATE OF CORRECTION

PATENT NO. : 5,194,560
DATED : March 16, 1993
INVENTOR(S) : Laugal, James, Martin, Glenn, St. Aubin, Donald and Wold, Gerald It is certified that error appears in the above-identified patent and that said Letters Patent is hereby corrected as shown below:

Column 7,
Line 50, change "block." to -- blocks. --;

Column 12,
Line 37, change "the 1,3,5" to -- the triisocyanates such as triphenyl methane - 4,4'4" - triisocyanate, 1,3,5 --;
Line 56, change "glycol, 1,3, -" to -- glycol, diethylene glycol, triethylene glycol, 1,4, - butylene glycol, 1,3 - --

Signed and Sealed this

Tenth Day of September, 2002

Attest:

JAMES E. ROGAN
*Attesting Officer*    *Director of the United States Patent and Trademark Office*